United States Patent [19]

Arendt

[11] 4,308,299
[45] Dec. 29, 1981

[54] LITHIATED NICKEL OXIDE

[75] Inventor: Ronald H. Arendt, Schenectady, N.Y.

[73] Assignee: General Electric Company, Schenectady, N.Y.

[21] Appl. No.: 191,136

[22] Filed: Sep. 26, 1980

[51] Int. Cl.$^3$ .............................................. H01M 27/00
[52] U.S. Cl. ........................... 427/215; 423/DIG. 12; 429/223; 429/16; 429/44; 429/45
[58] Field of Search ..................... 429/223, 44, 45, 16; 252/519; 423/DIG. 12; 427/215

[56] References Cited

U.S. PATENT DOCUMENTS 4,233,378 11/1980 Joo ..................................... 429/223

FOREIGN PATENT DOCUMENTS 1027634 4/1966 United Kingdom ................. 429/40

Primary Examiner—Sam Silverberg
Attorney, Agent, or Firm—Jane M. Binkowski; James C. Davis, Jr.; Joseph T. Cohen

[57] ABSTRACT

A mixture of particulate NiO, a suitable source of Li$^\oplus$ cation and an alkali chloride salt solvent is heated to melt the chloride solvent in which the source of Li$^\oplus$ cation dissolves along with a portion of the NiO particles forming a solution of lithiated nickel oxide which precipitates onto the undissolved NiO particles forming a black adherent encapsulating coating thereon.

9 Claims, No Drawings

LITHIATED NICKEL OXIDE

The present invention relates to a process for the preparation of lithiated nickel oxide powder particularly for use in the cathode of molten carbonate fuel cells. This material is presently prepared by oxidation of a suitably porous Ni plaque in the cathode environment during the early stages of fuel cell operation. Although it is generally recognized that the Ni oxidation is a rapid process under these conditions, there is some question as to the kinetics and completeness of the lithiation (by the molten electrolyte) step, which is required to establish the necessary electronic conductivity in the cathode structure. Further, the oxidation process alters the pore structure in the cathode in a difficult-to-predict or control manner. Since the electrode's porosity must appropriately compliment that in the electrolyte structure, it is desirable to maximize control over the development of the cathode porosity.

Control of the porosity characteristics in the cathode would be enhanced by the elimination of the in situ oxidation of the Ni plaque. One approach is to fabricate an appropriately lithiated NiO powder into the cathode structure. One would expect such a structure to better maintain the fabrication-established porosity characteristics, as well as to give the optimum electronic conductivity from the start of cell operation. The preparation of a suitable lithiated NiO powder by conventional solid-state diffusion techniques is difficult at best. High temperatures are required to achieve a suitably homogeneous $Li^{\oplus}$ distribution in the NiO, during which the $NiO:Li^{\oplus}$ sinters. The aggregated product must be comminuted to an appropriate particle size in order to be fabricated into the cathode structure. The comminution, a mechanical process, may lead to significant contamination of the $NiO:Li^{\oplus}$, which would ultimately adversely impact the cathode's performance.

The present invention provides a lithiated nickel oxide preparation which does not require the intensive comminution processes required with solid-state reacted materials. It is based on the use of a molten salt as the reaction medium for product formation. The salt performs two primary functions. First, it provides a boundary layer between the crystallites which prevents significant aggregate formation. Second, it provides a uniform composition (chemical activity) $Li^{\oplus}$ source in intimate contact with the NiO. This latter point is important in view of the documented volatility of Li compounds ($LiOH$, $Li_2O$, $Li_2CO_3$) at temperatures ($>> 1073$ K.) typically used to prepare lithiated nickel oxide.

Briefly stated, the present process for producing a lithiated nickel oxide powder of approximately predetermined $Li^{\oplus}$ cation content comprises providing a mixture of NiO particles in predetermined amount, a source of $Li^{\oplus}$ cation in predetermined amount and a molten alkali chloride salt solvent, said alkali chloride salt solvent being selected from the group consisting of sodium chloride, potassium chloride and mixtures thereof, dissolving in said molten solvent the source of $Li^{\oplus}$ cation and a portion of the NiO particles, reacting the dissolved NiO and $Li^{\oplus}$ cation in said molten alkali chloride solvent precipitating the resulting lithiated nickel oxide onto the undissolved NiO particles forming an adherent black encapsulating coating thereon, said molten chloride solvent being maintained at a reaction temperature at which said chloride solvent is molten but lower than the temperature at which said lithiated nickel oxide melts, said alkali chloride solvent being present in an amount at least sufficient to carry out said reaction, said source of $Li^{\oplus}$ cation being dissolvable in said molten chloride solvent to produce $Li^{\oplus}$ cation and by-product gas, and recovering the coated NiO particles by dissolving said chloride salt and separating said coated NiO particles from the resulting salt solution.

The reaction for producing lithiated nickel oxide is as follows:

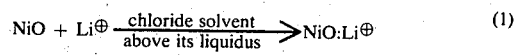  (1)

Although reaction (1) shows lithiated nickel oxide as $NiO:Li^{\oplus}$, each $Li^{\oplus}$ cation forming a solution with NiO converts a $Ni^{++}$ to $Ni^{+++}$, therefore, the Ni cation of $NiO:Li^{\oplus}$ is a mixture of $Ni^{++}$ and $Ni^{+++}$ until the solid solution limit is attained. Thereafter $LiNiO_2$ is formed as shown by the following reaction:

  (2)

In one embodiment of the present invention, alkali chloride salt and a precursor for the NiO particles are produced in situ by forming an aqueous solution of stoichiometric amounts of $NiCl_2$ and an alkali hydroxide selected from the group consisting of sodium hydroxide, potassium hydroxide and mixtures thereof, and a predetermined amount of the source of $Li^{\oplus}$ cation. The $NiCl_2$ and alkali hydroxide react, preferably at room temperature, producing particles of $Ni(OH)_2$ and the alkali chloride salt. The resulting mixture is heated to reaction temperature at which the alkali chloride is molten converting the $Ni(OH)_2$ particles to particles of NiO, a portion of which dissolves in the molten solvent, reacts with the $Li^{\oplus}$ cation and precipitates onto the undissolved NiO particles forming an adherent black encapsulating coating thereon. Preferably, in this embodiment, the source of $Li^{\oplus}$ cation is LiOH. This embodiment is illustrated by the following reaction:

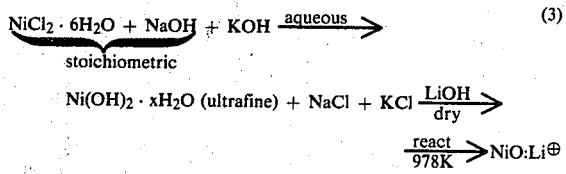  (3)

In another embodiment of the present invention, the alkali chloride salt and NiO particles are produced in situ by forming a mixture of stoichiometric amounts of $NiCl_2$ and an alkali carbonate and a predetermined amount of a source of $Li^{\oplus}$ cation, said alkali carbonate being selected from the group consisting of sodium carbonate, potassium carbonate and mixtures thereof, and heating said mixture to reaction temperature reacting said mixture producing the molten alkali chloride solvent and said NiO particles. Preferably, in this embodiment, the source of $Li^{\oplus}$ cation is LiOH. This embodiment is illustrated by the following reaction:

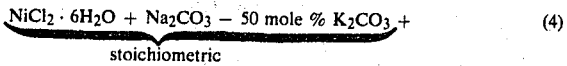  (4)

-continued

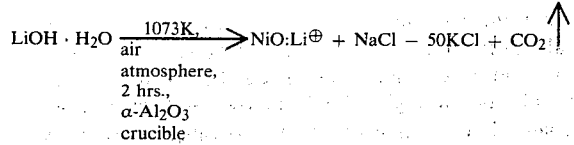

atmosphere,
2 hrs.,
α-Al₂O₃
crucible

Another embodiment of the present invention for producing lithiated nickel oxide powder of approximately predetermined Li⊕ cation content comprises providing particulate NiO in a predetermined amount or precursor therefor, providing a source of Li⊕ cation in a predetermined amount, providing an alkali chloride salt selected from the group consisting of sodium chloride, potassium chloride and mixtures thereof, forming a mixture of said NiO or precursor therefor, said source of Li⊕ cation and said chloride salt solvent, heating said mixture to a reaction temperatue at least sufficient to melt said chloride salt, dissolving in said molten solvent the source of Li⊕ cation and a portion of the NiO particles, said precursor decomposing completely at or below said reaction temperature to produce said NiO particles and by-product gas, said source of Li⊕ cation being dissolvable in said molten chloride solvent to produce Li⊕ cation and by-product gas, reacting the dissolved NiO and Li⊕ cation in said molten solvent precipitating the resulting lithiated nickel oxide onto the undissolved NiO particles forming an adherent black encapsulating coating thereon, said molten chloride solvent being maintained at a reaction temperature lower than the temperature at which said lithiated nickel oxide melts, said alkali chloride solvent being present in an amount at least sufficient to carry out said reaction, and recovering the coated NiO particles by dissolving said chloride salt and separating said coated NiO particles from the resulting salt solution.

In carrying out the present process, the reactants or precursors therefor can be of commercial or technical grade, and their particular purity depends largely on the particular application of the resulting lithiated nickel oxide powder. Specifically, the reactants should not contain any impurities which would have a significantly deleterious effect on the resulting lithiated nickel oxide powder or on its particular application.

The reactants or precursors therefor should be of a size which allows the reaction to take place. Generally, they are used and are satisfactory in the particle size range in which they are available commercially, which ordinarily ranges from submicron up to about 100 microns. The reactant powders should also be free of large, hard aggregates, i.e. significantly above 100 microns in size, which might survive the mixing process and prevent sufficient reactant contact for satisfactory reaction rates. Preferably, the NiO particles have an average particle size ranging from submicron to about 10 microns and most preferably, they are of submicron average particle size.

In the present process the chloride salt is selected from the group consisting of sodium chloride, potassium chloride and mixtures thereof. The alkali chloride solvent should be present in an amount at least sufficient to carry out the present reaction. Generally, the chloride salt solvent is present in a minimum amount of at least about 20% by weight of the total amount of reactants and chloride salt solvent, and typically about 50% by weight. Amounts of chloride salt significantly lower than about 20% by weight are not practical since the desired reaction will not proceed. There is no upper critical maximum amount of chloride salt, but amounts of chloride salt higher than about 80% by weight of the total amount of reactants and chloride salt solvent provide no significant advantage.

The reactants or precursors therefor or sources thereof and the alkali chloride salt solvent or sources thereof are admixed to produce a substantially thorough mixture to insure good contact and complete reaction. The actual mixing operation can be carried out in several ways which do not introduce undesirable impurities into the resulting lithiated nickel oxide powder, such as, for example, using a plastic or ceramic milling medium. For example, small ~0.10 kg product, samples can be mixed by tumbling of the components in a plastic jar. Larger samples, in units of 0.750 kg of product, are most conveniently mixed by dry milling in a 6.0 liter, all α-Al₂O₃ jar mill for a minimum of 15 minutes. The milling also serves to break down any reactant/solvent material agglomerates and reduce all materials to comparable particle sizes, aiding overall homogeneity. Wet milling and/or mixing can be used but offer no significant benefit over the dry milling.

The particular reaction temperature used depends largely on the chloride solvent present and the reaction rate desired, i.e. rate of precipitation desired. Generally, the higher the reaction temperature, the faster is the reaction rate. In molten form, the present chloride salt is a solvent for the source of Li⊕ cation and a minor portion of the NiO particles. Usually, from about $10^{-5}$ to about $10^{-10}$ mole fraction of NiO dissolves in the molten alkali chloride. The minimum reaction temperature is the temperature at which the chloride salt or salt mixture melts and for sodium chloride alone the melting point or liquidus temperature is about 1073° K.(800° C.) whereas for potassium chloride alone it is about 1063° K.(790° C.). All mixtures of sodium chloride and potassium chloride form a mixture which melts at a temperature below the melting point of sodium chloride alone and thus, for the eutectic mixture of 50 mole % potassium chloride —50 mole % sodium chloride the minimum reaction temperature is 931° K.(658° C.). Preferably, in the present invention, the minimum reaction temperature is at least about 10° K. above the melting point, i.e. liquidus temperature of the chloride salt or salt mixture since such a temperature insures complete melting of chloride salt and also increases the fluidity of the molten salt producing increased wetting of the reaction mixture. However, the maximum reaction temperature is always below the melting point of the lithiated nickel oxide being precipitated, which is approximately the same as that of NiO 2263° K.(1990° C.) and should be kept below the temperature at which the chloride salt vaporizes significantly. Particularly preferred is a reaction temperature ranging from about 973° K.(700° C.) to about 1373° K.(1100° C.) since it is not difficult to maintain and provides high precipitation rates without significant vaporization of the molten salt solvent.

At reaction temperature, the chloride salt melts and the Li⊕ cation source dissolves therein along with a portion of the NiO particles. The dissolved NiO reacts with the Li⊕ cation forming a solution therewith, i.e. lithiated nickel oxide, which precipitates onto the undissolved NiO particles forming a black coating thereon which encapsulates the NiO particle or particles. The thickness of the deposited coating can be varied by a number of techniques such as, for example, varying the time at temperature. The reaction temperature is maintained until the reaction is completed. The particular period of reaction time depends largely on reaction temperature as well as the amount of chloride salt present and is determinable empirically. When the reaction is completed, the reacted mass is cooled at any convenient rate, preferably in air and preferably to about room temperature.

The cooled reacted mass is a solid, fired cake wherein the lithiated nickel oxide coated NiO particles are distributed throughout a matrix of solidified chloride salt. The cake is disintegrated with water to yield the coated particles and an aqueous solution of NaCl and/or KCl. More specifically, water, preferably distilled or deionized to prevent introduction of impurities and preferably at room temperature, is added to the solid reacted mass in an amount at least sufficient to dissolve away the chloride salt content therefrom. The solubility of the present chloride salt is about 0.3 kilogram per liter of water at room temperature. This dissolution preferably is carried out in a plastic vessel, and as a practical matter with mixing to substantially shorten dissolution time, using, for example, a motor driven plastic or stainless steel stirrer. As the chloride salt dissolves, the solid mass disintegrates leaving the coated particles, i.e. powder, that contains no perceptibly agglomerated material, i.e. perceptible to the eye which is then collected, washed and dried.

The present coated powder can be recovered from the aqueous supernatent chloride solution by a number of techniques. For example, it can be recovered by decanting the supernatant solution and drying the powder in air. The particular recovery technique depends on the impurities which may be present, and on the purity required in the product fabricated from the powder. Preferably, a flocculating agent which is organic and soluble in water, preferably an anionic flocculant, is added in an amount which is sufficient to flocculate and settle the powder. After several washings and settlings, the wet powder is dried. Preferably, the flocculating agent is added in aqueous solution, about 0.1 gram of flocculant per 100 grams of water usually being satisfactory, and preferably the flocculating agent is used only in an amount necessary to settle the powder. For production of powder of high purity, the flocculating agent should be completely removable by heating the powder in air at temperature below the melting point of the powder and preferably not higher than about 1073° K.(800° C.). Preferably, to remove any remaining water and flocculant, it is heated at about 773° K.(500° C.) for about 20 minutes.

Alternatively, in the present process, if desired, a particulate inorganic precursor of NiO can be used. The precursor should decompose completely to form NiO particles and by-product gas or gases leaving no contaminants in the reacted mass. Representatives of the precursors of NiO useful in the present process are the carbonates, hydroxides and nitrates. The precursor should be used in an amount sufficient to product NiO in the desired amount.

The present source of Li⊕ cation is a compound or material which dissolves in the present molten alkali chloride producing Li⊕ cation and by-product gas. Representative of the present source of Li⊕ cation useful in the present process is $Li_2O$, $LiNO_3$, $LiOH$, $Li_2CO_3$ and $Li_2SO_4$.

The present coated powder is electronically conducting and it is comprised of NiO particles encapsulated with a black adherent coating of lithiated nickel oxide. The coating is comprised of nickel oxide and Li⊕ cation in solid solution therein wherein the nickel cation is a mixture of $Ni^{++}$ and $Ni^{+++}$ cations until it is saturated with Li⊕ cations at which saturation point it is $Ni^{+++}$.

The Li⊕ cation content of the present coated powder should be at least sufficient to make it electronically conductive. Usually, about 0.02 Li⊕ to about 0.03 Li⊕ cation fraction of the total content of Li⊕ and nickeel cations of the powder makes the powder electronically conductive. The maximum amount of Li⊕ cation content is its saturation point in the nickel oxide and such saturation point is about 0.10 Li⊕ to about 0.15 Li⊕ cation of the total content of Li⊕ and nickel cations of the powder. The present powder contains Li⊕ cation in predetermined amount which depends largely on the particular electronic properties desired. The present source of Li⊕ cation is used in a predetermined amount required to produce the predetermined amount of Li⊕ cation in the powder and such predetermined amounts are determinably empirically. Usually, an amount of the source of Li⊕ cation in excess of that required for the powder is used to establish a specific melt Li⊕ activity.

The Li⊕ cation content of the present powder can be determined by a number of techniques such as, for example, wet chemical analysis.

X-ray diffraction analysis of the present powder shows phase pure NiO.

The present coated powder can be prepared free of impurities or freeof significant impurities. Therefore, when the same procedure is used, its properties are reproducible from batch to batch.

The present powder can be fabricated into a form having a variety of electronic applications. For example, it can be compressed into a compact useful as a cathode in a molten carbonate fuel cell.

The invention is further illustrated by the following examples wherein the procedure was as follows unless otherwise stated:

The materials used were of reagent grade.

The Li⊕ cation fraction determined by wet chemical analysis is based on the total Li⊕ cation and nickel cation content of the powder.

EXAMPLE 1

This example can be illustrated by the following reaction :

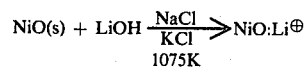

500 Grams of NiO powder having an average particle size of about 0.1 microns, 38.29 grams of $LiOH.H_2O$ ranging in size up to about 100 microns, 219.70 grams of NaCl and 280.30 grams of KCl were mixed by rolling in a polyethylene jar for five hours to give an apparently homogeneous mixture. The mixture was then loaded into dense, covered $\alpha-Al_2O_3$ crucibles and heated at 100 K hour$^{-1}$ to 1078 K where it was held for 5.5 hours in an air atmosphere, then cooled ($\leq 100$ K. hour$^{-1}$) to room temperature.

To retrieve the product, the cooled mass was placed in 6 liters of distilled water at room temperature in a plastic vessel provided with a motor driven plastic coated stainless steel stirrer. After ~10 minutes of stirring, the brick-like cake product disintegrated completely into a fine powder that contained no visually perceptible aggregated material. The resulting slurry was rendered pH ~6 with CH₃COOH. Mixing of the resulting slurry was continued at room temperature for 30 minutes.

About 25 ml of a 0.1 wt. % aqueous flocculating solution of anionic flocculant (a polyamide imide powder sold under the trademark Hercofloc 821) in distilled water was then added to the stirred slurry. The powder was then collected on filter (qualitative grade) washed with copious distilled $H_2O$, finally 95 vol. % $CH_3CH_2OH$ and dried in air at 523 K.

500.0 Grams of product was retrieved. The product was a black powder. Portions of the powder were analyzed. X-ray diffraction analysis of the product showed phase pure NiO. B.E.T. surface area measurements of the product gave a value of 1.12 meters² gram⁻¹ which indicates a spherical equivalent average crystal diameter of ~0.797 micron. Wet chemical analysis of the powder gave a Li⊕ cation fraction of 0.038 (3.8 cation %).

EXAMPLE 2

This example can be illustrated by the following reaction:

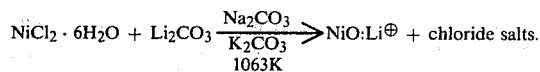

167.34 Grams of NiCl₂.6H₂O having an average particle size of about 100 microns, 13.81 grams of LiCO₃ ranging in particle size up to about 100 microns,, 35.47 grams of Na₂CO₃ and 46.25 grams of K₂CO₃ were placed in mortar and pestle and comminuted to apparent homogeneity. The resulting mixture was transferred to a dense, covered α—Al₂O₃ crucible, heated at 100 K. hour⁻¹ to 1063 K. where it was held for 5 hours in air atmosphere, then cooled at ≦100 K. hour⁻¹ to room temperature.

The product was retrieved in the same manner as disclosed in Example 1 except that 2 liters of distilled H₂O were used.

X-ray diffraction analysis of the powder showed phase pure NiO. BET surface measurements of the powder gave a value of 1.63 meters² gram⁻¹ which indicates a spherical equivalent average crystal diameter of 0.55 micron. Wet chemical analysis of the powder gave an Li⊕ cation fraction of 0.054 (5.4 cation %).

EXAMPLE 3

This example can be illustrated by the following reaction:

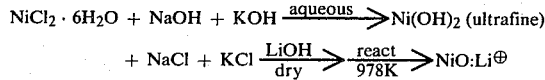

The four components used were 159.08 grams of NiCl₂.6H₂O having an average particle size of about 100 microns, 7.02 grams of LiOH.H₂O having a particle size ranging up to about 100 microns, 42.43 grams of 88.5 wt. % KOH and 34.5 ml of a 50 wt. % NaOH aqueous solution. The NiCl₂.6H₂O was dissolved in 200 ml. distilled water. The NaOH and KOH components were dissolved in 200 ml distilled water, and the LiOH.H₂O in 50 ml distilled water producing three separate solutions. The NaOH-KOH solution was added to the NiCl₂ solution with vigorous stirring to precipitate ultrafine Ni(OH)₂.xH₂O in aqueous NaCl-KCl to which the LiOH solution was then added and thoroughly homogenized with vigorous stirring.

The resulting slurry-solution was reduced to dryness by heating in air to 453 K. The resulting dried material was transferred to a dense covered α-Al₂O₃-crucible and heated t 100 K. hour⁻¹ to 978 K wherein it was held for 30 minutes in an air atmosphere, then cooled at ≦100 K. hour⁻¹ to room temperature. The product was retrieved in the same manner as disclosed in Example 1.

50 Grams of product were retrieved. The product was a black free-flowing powder. X-ray diffraction analysis of the powder showed phase pure NiO. B.E.T. surface measurements of the powder gave a value of 6.25 meters² gram⁻¹ which indicates a spherical equivalent average crystal diameter of about 0.14 micron.

EXAMPLE 4

About 500 grams of the powder produced in Example 1 were milled for 2 hours in absolute using 3/8 inch diameter dense α-Al₂O₃ balls and then dried by infrared heating.

~0.5 g of the resulting dry powder was compressed in a steel die at room temperature under a pressure of 2000 psi. The resulting pellet had a density of about 55% of theoretical.

The pellet was placed in a conductivity measuring apparatus. Its conductivity was measured at 923 K. in a flowing atmosphere comprised of a mixture of oxygen and carbon dioxide and determined to be 20.63 reciprocal ohm centimeters. Such a conductivity makes it useful as a cathode in a molten carbonate fuel cell.

EXAMPLE 5

The powder produced in Example 4 can be compressed in a steel die at room temperature under a pressure of 2000 psi to produce a plate 4" square having a thickness of about 15 mils and a density of about 45% of theoretical. Such a plate would be useful as a cathode in a molten carbonate fuel cell.

The following copending U.S. patents and applications which disclose the utilization of a molten solvent of NaCl and/or KCl, are assigned to the assignee hereof and are incorporated herein by reference:

U.S. Pat. No. 4,152,281 entitled MOLTEN SALT SYNTHESIS OF LEAD ZIRONCATE TITANATE SOLID SOLUTION POWDER to Arendt et al. discloses that sodium chloride and/or potassium chloride is added to an aqueous suspension of the oxides of lead, titanium and zirconium and stirred until the suspension converts to a gel which is then heated evaporating the water and melting said chloride in which the oxides dissolve and react precipitating lead zirconate titanate.

U.S. Pat. No. 4,152,280 to Arendt et al. entitled MOLTEN SALT SYNTHESIS OF MODIFIED LEAD ZIRCONATE TITANATE SOLID SOLUTION POWDER discloses that sodium chloride and/or potassium chloride is added to an aqueous suspension of the oxides of lead, titanium zirconium and cationic modifier and stirred until the suspension converts to a gel which is then heated, evaporating the water and melting said chloride in which the oxides dissolve and react precipitating modified lead zirconium titanate.

Ser. No. 085,924 filed Oct. 18, 1979, U.S. Pat. No. 4,233,288 for R. H. Arendt entitled MOLTEN SALT SYNTHESIS OF BARIUM AND/OR STRONTIUM TITANATE POWDER discloses a process consisting essentially of forming a mixture of an alkali metal chloride solvent salt, titanium oxide and an alkaline earth reactant selected from the group consisting of barium oxide, strontium oxide, and mixtures thereof, and heating said mixture to melt the chloride salt solvent in which the titanium oxide and alkaline earth reactant dissolve and react precipitating a titanate selected from the group consisting of barium titanate, strontium titanate and mixtures thereof.

Ser. No. 180,343 filed Aut. 1980 for R. H. Arendt entitled MOLTEN SALT SYNTHESIS OF ALKALINE EARTH ZIRCONATE POWDER discloses a process consisting essentially of forming a mixture of an alkali metal chloride solvent salt, zirconium oxide and an alkaline earth reactant selected from the group consisting of barium oxide, strontium oxide, and mixtures thereof, and heating the resulting mixture to melt the chloride salt solvent in which the zirconium oxide and alkaline earth reactant dissolve and react precipitating a zirconate selected from the group consisting of barium zirconate, strontium zirconate and mixtures thereof.

What we claim as new and desire to secure by Letters Patent of the United States is:

1. A process for producing a lithiated nickel oxide powder of approximately predetermined Li$^\oplus$ cation content which comprises providing a mixture of NiO particles in predetermined amount, a source of Li$^\oplus$ cation in predetermined amount and a molten alkali chloride salt solvent, said alkali chloride salt solvent being selected from the group consisting of sodium chloride, potassium chloride and mixtures thereof, said source of Li$^\oplus$ cation being dissolvable in said molten chloride solvent to produce Li$^\oplus$ cation and by-product gas, dissolving in said molten solvent the source of Li$^\oplus$ cation and a portion of the NiO particles, reacting the dissolved NiO and Li$^\oplus$ cation in said molten alkali chloride solvent precipitating the resulting lithiated nickel oxide onto the undissolved NiO particles forming an adherent black encapsulating coating thereon, said molten chloride solvent being maintained at a reaction temperature at which said chloride salt is molten but lower than the temperature at which said lithiated nickel oxide melts, said alkali chloride solvent being present in an amount at least sufficient to carry out said reaction, and recovering the coated NiO particles by dissolving said chloride salt and separating said coated NiO particles from the resulting salt solution.

2. A process according to claim 1 wherein said alkali chloride salt and a precursor for the NiO particles are produced in situ by forming an aqueous solution of stoichiometric amounts of NiCl$_2$ and an alkali hydroxide selected from the group consisting of sodium hydroxide, potassium hydroxide and mixtures thereof, and said source of Li$^\oplus$ cation, reacting said NiCl$_2$ and alkali hydroxide producing Ni(OH)$_2$ particles and said alkali chloride salt, and heating the resulting mixture to said reaction temperature producing said NiO particles.

3. A process according to claim 2 wherein said source of Li$^\oplus$ cation is LiOH.

4. A process according to claim 1 wherein said alkali chloride salt and said NiO particles are produced in situ by forming a mixture of stoichiometric amounts of NiCl$_2$ and an alkali carbonate and a predetermined amount of a source of Li$^\oplus$ cation, said alkali carbonate being selected from the group consisting of sodium carbonate, potassium carbonate and mixtures thereof, and heating said mixture to said reaction temperature reacting said mixture producing said molten alkali chloride solvent and said NiO particles.

5. A process according to claim 4 wherein said source of Li$^\oplus$ cation if LiOH.

6. A process according to claim 1 wherein said chloride salt is a mixture comprised of about 50 mole % sodium chloride and about 50 mole % potassium chloride.

7. A process for producing lithiated nickel oxide powder of approximately predetermined Li$^\oplus$ cation content which comprises providing particulate NiO in a predetermined amount of precursor therefor, providing a source of Li$^\oplus$ cation in a predetermined amount, providing an alkali chloride salt selected from the group consisting of sodium chloride, potassium chloride and mixtures thereof, forming a mixture of said NiO or precursor therefor, said source of Li$^\oplus$ cation and said chloride salt solvent, heating said mixture to a reaction temperature at least sufficient to melt said chloride salt, dissolving in said molten solvent the source of Li$^\oplus$ cation and a portion of the NiO particles, said precursor decomposing completely at or below said reaction temperature to produce said NiO particles and by-product gas, said source of Li$^\oplus$ cation being dissolvable in said molten chloride solvent to produce Li$^\oplus$ cation and by-product gas, reacting the dissolved NiO and Li$^\oplus$ cation in said molten solvent precipitating the resulting lithiated nickel oxide onto the undissolved NiO particles forming an adherent black encapsulating coating thereon, said molten chloride solvent being maintained at a reaction temperature lower than the temperature at which said lithiated nickel oxide melts, said alkali chloride solvent being present in an amount at least sufficient to carry out said reaction, and recovering the coated NiO particles by dissolving said chloride salt and separating said coated NiO particles from the resulting salt solution.

8. A process according to claim 7 wherein said source of Li$^\oplus$ cation is selected from the group consisting of Li$_2$O, LiNO$_3$, LiOH, Li$_2$CO$_3$ and Li$_2$SO$_4$.

9. A process according to claim 7 wherein said alkali chloride solvent is a mixture comprised of about 50 mole percent sodium chloride and about 50 mole percent potassium chloride.

* * * * *